Dec. 7, 1965 J. W. COOK 3,222,657

MAGNETIC DEVICE

Filed Sept. 14, 1960

INVENTOR

John W. Cook

BY Connolly and Hutz

ATTORNEYS

United States Patent Office 3,222,657
Patented Dec. 7, 1965

3,222,657

MAGNETIC DEVICE

John W. Cook, Shady Side, Md., assignor, by mesne assignments, to Sprague Electric Company, a corporation of Massachusetts Filed Sept. 14, 1960, Ser. No. 55,889
1 Claim. (Cl. 340—174)

This invention relates to a magnetic device incorporating electrically conductive and magnetic filaments which are helically wrapped about each other, and it more particularly relates to such a device which is utilized as a memory cell.

A magnetic information storage element called a Twistor is described on pages 1319–1340 of the Bell System Technical Journal of November 1957. This article mentions various types of memory cells incorporating helically wrapped filaments of the aforementioned type, and one of these types of elements is formed by wrapping permalloy tape around a copper conductor to provide a helical or spiral magnetic path. These Twistors have been utilized as memory cells in which information bits are stored in zones of, for example, 15 turns of tape which are positioned beneath single-strip solenoids that carry "read" and "write" currents. The copper conductor can be utilized for carrying either excitation or sense currents. This type of Twistor has been found quite useful as a memory element. However, the magnetic linkage between the electrically conductive and magnetic filaments could be improved, and cross-talk between adjacent zones of the magnetic filament is often troublesome.

An object of this invention is to provide a structure for a Twistor type of magnetic device which enhances its operating characteristics; and Another object is to provide such a structure which minimizes cross-talk between adjacent zones of the magnetic filament and improves the magnetic linkage between the separate filaments.

In accordance with this invention portions of the helically wrapped filaments of a Twistor are physically deformed by being pressed into each other to form a series of deformed or worked areas along their length. These worked areas simultaneously offer substantial impedance to magnetic cross-talk between adjacent zones of the magnetic filament and minimize the distance between the centers of the filaments which improves their magnetic linkage.

Novel features and advantages of the present invention will become apparent to one skilled in the art from a reading of the following description in conjunction with the accompanying drawings wherein similar reference characters refer to similar parts and in which.

Figures 1, 2, 3, 4, 5, 6, 7, 8:
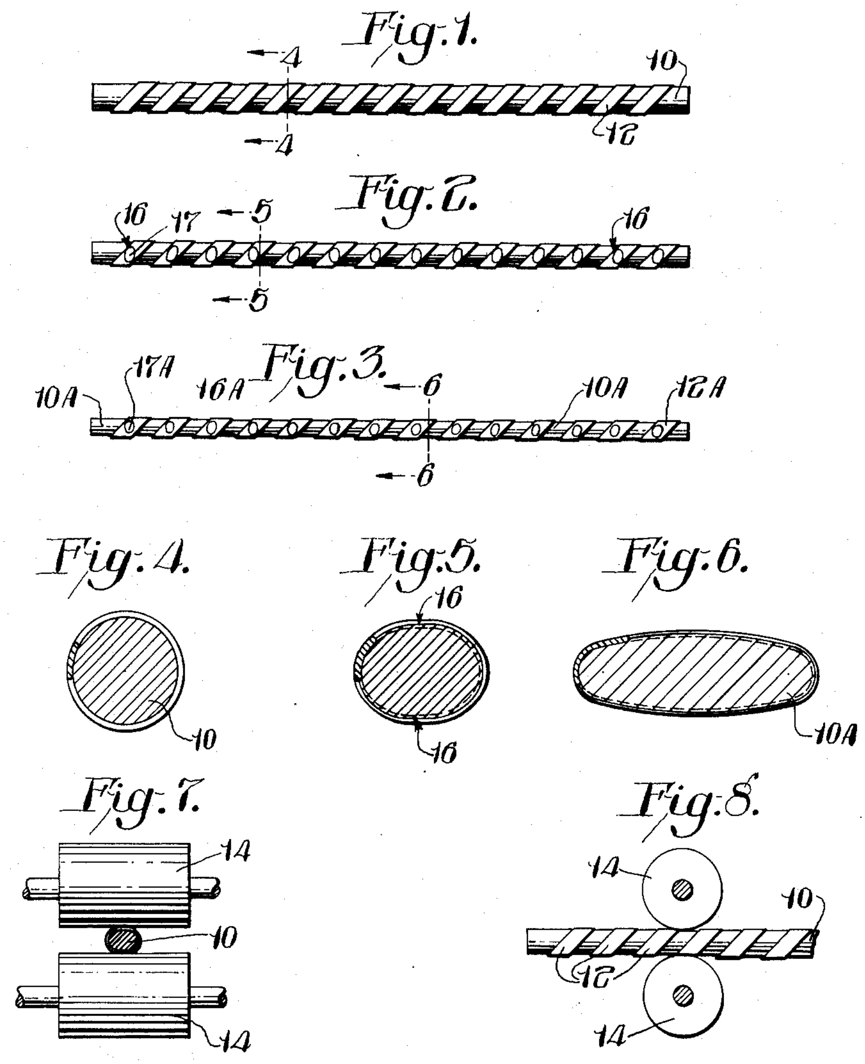
FIG. 1 is a side view in elevation of a pair of wrapped filaments which are later formed into an embodiment of this invention.
FIG. 2 is a side view in elevation of the filaments shown in FIG. 1 after being formed into an embodiment of this invention.
FIG. 3 is a side view in elevation of another embodiment of this invention.

FIGS. 4, 5 and 6 are cross-sectional views respectively taken through FIGS. 1, 2 and 3 along the lines 4—4, 5—5 and 6—6;

FIG. 7 is a front view in elevation of the wires in FIG. 1 being formed into the embodiment shown in FIG. 2; and FIG. 8 is a side view in elevation of the subject matter shown in FIG. 7.

In FIG. 1 are shown a pair of filaments 10 and 12. Filament 12 is helically wrapped about filament 10. Filament 10 is an electrically-conductive wire made, for example, of copper which is 0.003" in diameter, and filament 12 is made of extremely thin magnetic tape, such as molybdenum permalloy which is 0.003" wide and 0.0003" thick. These wrapped filaments are drawn between a pair of steel rollers 14 as shown in FIGS. 7 and 8 to deform separated portions 16 as shown in FIGS. 2 and 5 in which filaments 10 and 12 merge into each other to create localized physically worked or pressure-deformed areas 17 along magnetic filament 12. These worked or pressure-deformed portions which are, for example, cold worked create an increased impedance to magnetic cross-talk between adjacent zones of filament 12 that they separate which segregates the magnetic bits of information stored between them. Furthermore, the distance between the centers of the filaments are minimized by their merging which improves the magnetic linkage between the conductor 10 and magnetic element 12. Deformed and merged portions 16 are shown in a linear pattern upon each helical turn in FIG. 2, which facilitates their formation in the manner indicated in FIGS. 7 and 8. However, other distributions of these deformed areas may be utilized even though this somewhat complicates their provision.

In FIGS. 3 and 6 are shown another form of this invention in which the cross section of conductive filament 10A is of flatter oval form, which is for example 0.003" wide and 0.001" thick. This permits a magnetic filament 12A having for example the same structure as filament 12 of FIG. 2 to have its center brought even closer to the center of conductive filament 10A than that achieved in FIG. 2. The resultant merging structure shown in FIGS. 3 and 6 accordingly has even more improved magnetic linkage than that of FIG. 2.

What is claimed is:

A magnetic device comprising filaments one of which is helically wrapped about the other, one of said filaments being made of electrically conductive material, the other of said filaments being made of magnetic material and said filaments having separated portions deformed by external pressure linearly along the length of said filaments so that localized portions are extensively physically cold-worked by the application of pressure without the use of any external heat, said filaments merging at said separated portions of localized cold working, said magnetic filaments characterized by adjacent zones separated by said deformed portions so that magnetic cross talk between the adjacent zones is minimized and the magnetic linkage between the filaments is greater than that of undeformed helically wrapped filaments.

References Cited by the Examiner

UNITED STATES PATENTS 3,019,125 1/1962 Eggenberger et al. ---- 340—174

FOREIGN PATENTS 205,776 10/1959 Austria.
876,454 8/1961 Great Britain.

OTHER REFERENCES

Pages 1319–1340: November 1957—Publication I, "A New Storage Element Suitable for Large-Sized Memory Arrays—The Twister," by Bobeck in The Bell System Technical Journal, vol. 36, No. 6.

Pages 385–425: April 1959—Publication II, "Computer Components," by Looney in Journal of Applied Physics, supp. to vol. 30, No. 4.

IRVING L. SRAGOW, *Primary Examiner.*

JOHN F. BURNS, *Examiner.*